United States Patent [19]

Huggins, Jr. et al.

[11] 4,078,677
[45] Mar. 14, 1978

[54] PORTABLE SELF UNLOADING STORAGE CONTAINER

[75] Inventors: Major B. Huggins, Jr., Spindale; Ralph H. Rollins, Forest City, both of N.C.

[73] Assignee: Stonecutter Mills Corporation, Spindale, N.C.

[21] Appl. No.: 637,368

[22] Filed: Dec. 3, 1975

[51] Int. Cl.² .............................................. B60P 1/00
[52] U.S. Cl. .................................... 214/82; 214/17 D
[58] Field of Search ............... 214/17 D, 17 DA, 82, 214/83.14, 83.22, 83.3, 310, 510, 514, 767, 146 E; 198/748, 746, 741; 222/409; 239/671–672, 674, 676

[56] References Cited

U.S. PATENT DOCUMENTS

| 2,091,068 | 8/1937 | Girl .................................... 214/65 |
| 2,695,107 | 11/1954 | Baker .................................. 214/17 |
| 2,711,262 | 6/1955 | Bing ................................... 214/520 |
| 3,063,581 | 11/1962 | Bruecker ............................ 214/17 |
| 3,110,406 | 11/1963 | Roth ................................... 214/82 |
| 3,161,305 | 12/1964 | Ferrari et al. ..................... 214/82 |
| 3,212,652 | 10/1969 | Roberts .............................. 214/17 |
| 3,441,149 | 4/1969 | Svoboda ............................. 214/17 |
| 3,613,926 | 10/1971 | Scroggins ....................... 214/17 DA |
| 3,719,290 | 3/1973 | Voigtlaender ................... 214/170 |
| 3,815,764 | 6/1974 | Gilfillan et al. ................. 214/82 |

*Primary Examiner*—Drayton E. Hoffman
*Assistant Examiner*—Lawrence E. Williams
*Attorney, Agent, or Firm*—Bell, Seltzer, Park & Gibson

[57] ABSTRACT

The portable self unloading storage container may be in the form of a trailer, which may be used to transport, store, and unload particulate material, such as sawdust, to be used as fuel for a furnace. A carriage is supported for reciprocating movement along the bottom of the storage container and a pusher extends transversely of the storage container and slides along the bottom to move a quantity of the material toward and out of the discharge end. A rotary digger is also supported by the carriage and operates to engage and loosen the material so that a portion of the particulate material is positioned on the rearward side of the pusher to be moved out of the delivery end with each rearward movement of the carriage to the discharge end.

13 Claims, 6 Drawing Figures

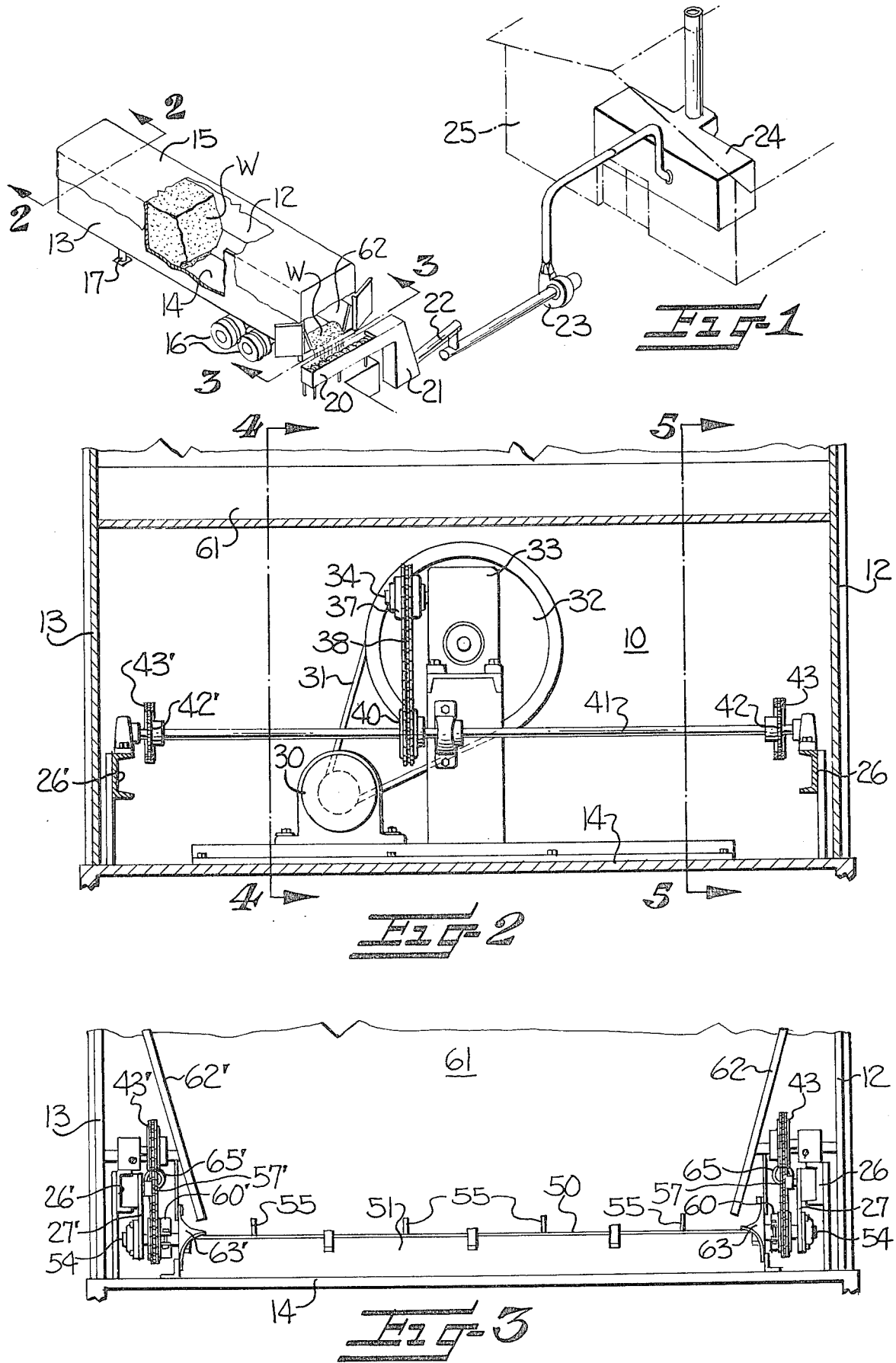

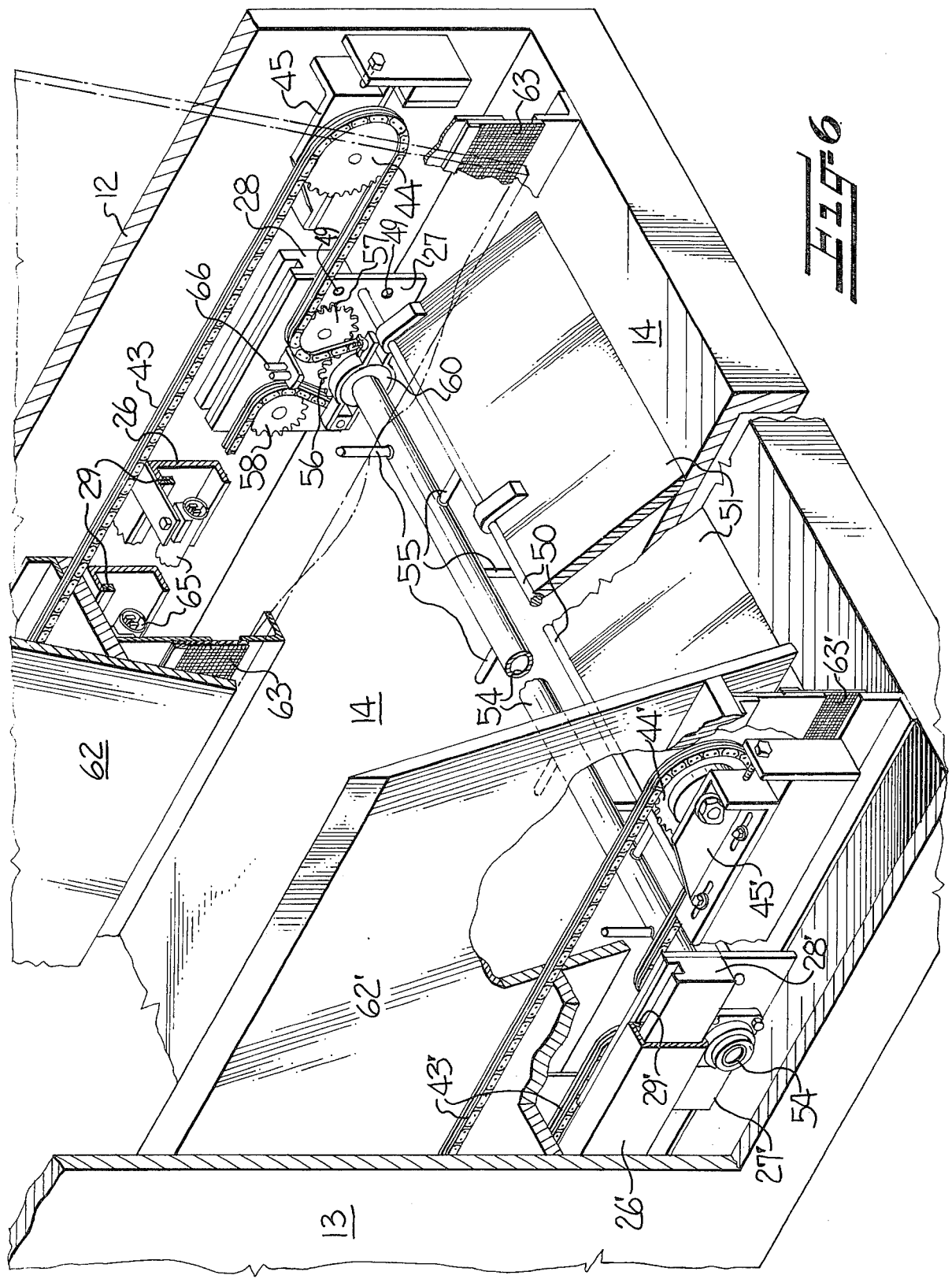

PORTABLE SELF UNLOADING STORAGE CONTAINER

This invention relates generally to portable self unloading storage containers and more particularly to a particulate material unloader for a storage container, such as a trailer, which may be used to transport, store and unload the particulate material, such as sawdust, to be used as fuel for a furnace, boiler or the like.

Many furnaces and boilers in industrial plants may be operated on several different types of fuel, such as natural gas, fuel oil, coal or particulate material in the form of waste products, such as sawdust and the like. Because of high fuel cost and the uncertainty of delivery of natural gas, it is desirable to operate industrial furnaces and boilers on various types of readily available and economical particulate material, such as sawdust. Heretofore, it has been the common practice to construct a rather large and expensive storage facility at a location close to the furnace so that the sawdust will be readily availble for use, when needed. The sawdust must be transported from the source and placed in the storage facility, and then it must be removed from the storage facility and placed in some type of conveying apparatus so that it will be fed into the furnace. These several handlings of the sawdust increases the normally inexpensive cost of firing the furnace by means of this type of product.

With the foregoing in mind, it is an object of the present invention to provide a portable self unloading storage container, such as a trailer, which may be used to transport, store, and unload particulate material, such as sawdust, so that it may economically used as fuel for a furnace, boiler or the like.

In accordance with the present invention, the portable self unloading storage container is provided for storing and discharging a predetermined quantity of particulate therefrom. The container includes a body portion providing a storage chamber having a bottom and a discharge opening to permit particulate material moved along the bottom wall to pass therethrough. A carriage is mounted in the storage chamber for reciprocating movement over the bottom and toward and away from the discharge opening. Particulate material moving means is carried by the carriage and includes an elongate pusher member with its longitudinal dimension disposed parallel to the bottom and its bottom edge normally in sliding contact with the bottom. The pusher member is transversely inclined in a direction away from the discharge opening and at such an angle that no more than a predetermined quantity of the particulate material will be moved toward the discharge opening with any excess material moving up the inclined pusher member and spilling over the top edge thereof. The positioned relationship of the pusher member may be changed to vary the quantity of particulate material being moved thereby.

The unloader includes tracks extending along opposite sides and adjacent the bottom of the storage container with carriage plates supported for sliding movement along the tracks and drive means for moving the carriage plates forwardly and rearwardly along the elongate body of the container. The pusher member is hingedly supported on the carriage plates and extends transversely of the container with the lower edge of the pusher member being slideably supported on the bottom of the container to move no more than a predetermined quantity of the material toward the discharge end each time the carriage plates are moved rearwardly.

Digger means is supported on the carriage plates and forwardly of the pusher and includes a rotary shaft. Radial spikes extend outwardly from the rotary shaft to engage and loosen the material and to permit entry of the rotary shaft into the material so that a portion of the material is positioned on the rearward side of the pusher to be moved out of the discharge opening of the container with each rearward movement of the carriage plates. A brake engages the rotary shaft to prevent rotation of the rotary shaft upon forward movement of the carriage plates until the rotary shaft engages the material and sufficient resistance to movement takes place to overcome the brake.

The unloader may be positioned in a trailer which is used to transport, store, and unload the material so that it may be conveniently fed directly into a furnace. Suitable timing controls are provided to regulate the operation of the drive means so that a sufficient quantity of the material is moved rearwardly and out of the discharge end of the trailer to satisfy the fuel requirements of the furnace.

Other objects and advantages will appear as the description proceeds when taken in connection with the accompanying drawings, in which:

FIG. 1 is an isometric view of a trailer with the particulate material unloader associated therewith and illustrating one typical arrangement for moving the material directly into the furnace in an industrial plant;

FIG. 2 is an enlarged fragmentary transverse vertical sectional view through the forward end of the trailer, being taken substantially along the line 2—2 in FIG. 1, and illustrating the drive means for the unloader;

FIG. 3 is a fragmentary elevational view of the lower portion of the discharge end of the trailer, being taken substantially along the line 3—3 in FIG. 1;

FIG. 6 is a fragmentary isometric view, with parts broken away, of the discharge end of the trailer, illustrating the manner in which the carriage plates are supported for sliding movement along the tracks at opposite sides of the trailer.

Figure 4:
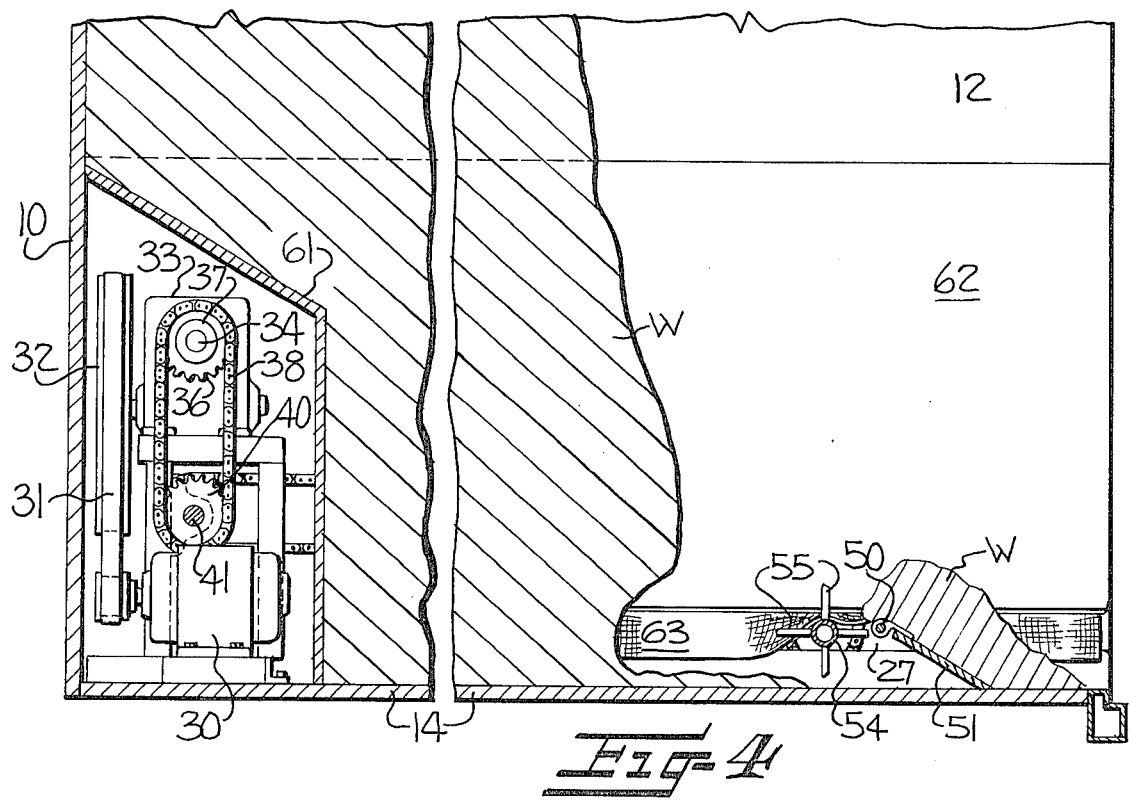
FIG. 4 is a fragmentary longitudinal vertical sectional view taken substantially along the line 4—4 in FIG. 2 with the central portion of the trailer being broken away.

The particulate material unloader of the present invention is illustrated as being incorporated in a trailer for unloading a waste product, such as sawdust, and feeding the sawdust directly to a furnace in an industrial plant. However, it is to be understood that the present unloader may also be adapted for use in unloading other types of granular, loose or particularized material, such as grain or other products and the unloader is not limited to the feeding of material to be used as fuel for a furnace. Also, the present unloader is not limited to use in a trailer but may be used in any other type of storage container of suitable size and shape which may or may not be used to transport the material to be unloaded.

As illustrated in the drawings, the trailer is provided with a closed forward end 10 (FIGS. 4 and 5), opposite sides 12, 13 (FIG. 2), a bottom 14, and a rear discharge end having an opening at least adjacent the bottom 14. As illustrated in FIG. 1, the trailer may be of the open-top type and may be provided with a canvas cover 15 or the like. Wheels 16 are provided for movement of the trailer by the conventional type transport cab or tractor. The usual jack type support 17, which may be in the form of wheels, is provided for suppporting the forward end of the trailer when it is detached from the tractor.

As the sawdust, indicated at W, is discharged out of the discharge end, in a manner to be presently described, it is deposited onto a conveyor 20 and carried to a storage bin 21 where it is removed by a screw conveyor 22. A blower 23 feeds the sawdust into a furnace 24 which is housed in an industrial plant, indicated at 25 in dash-dot lines in FIG. 1.

Figure 5:
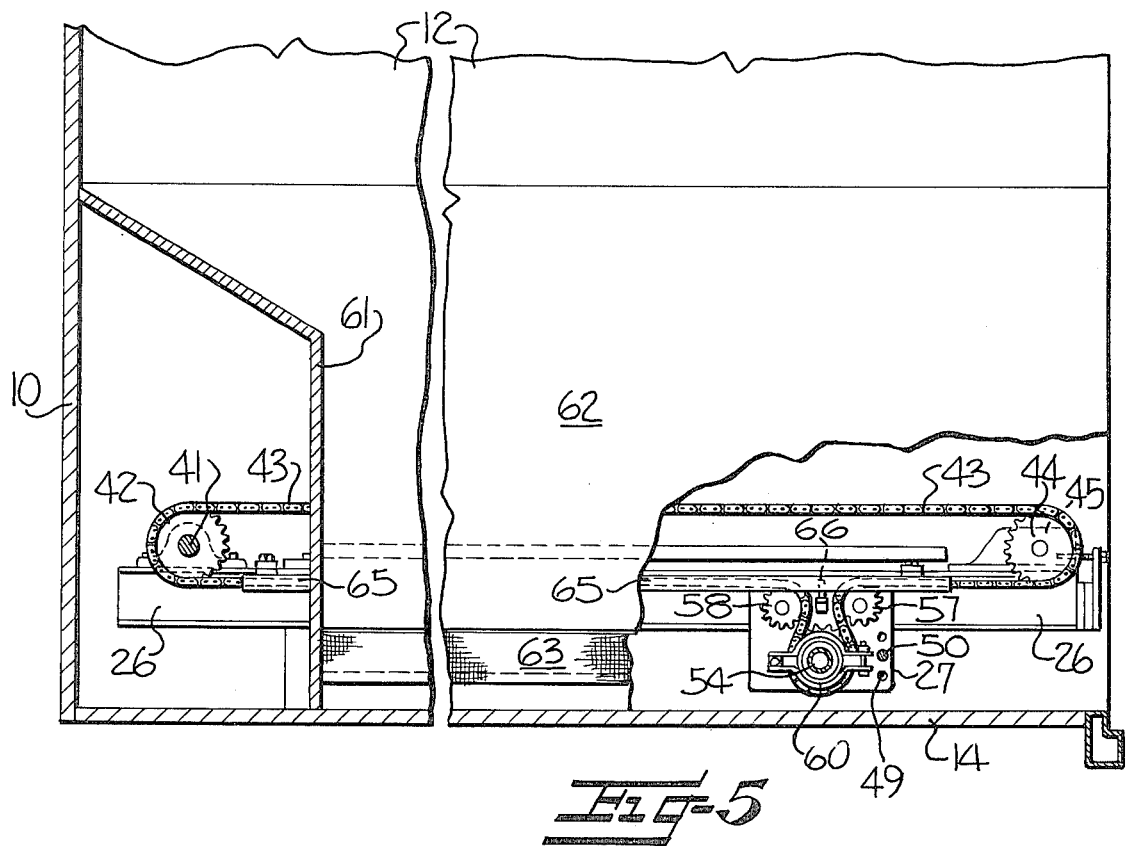
FIG. 5 is a view similar to FIG. 4 but being taken substantially along the line 5—5 in FIG. 2.

Track means extends along the opposite sides 12, 13 and adjacent the bottom 14 of the trailer. The track means includes a pair of C-channels 26, 26' with their open sides facing the interior of the trailer. The track channels 26, 26' are suitably supported and extend along opposite sides of the trailer and from the discharge end to a point adjacent the forward end wall 10 (FIG. 5). Since the parts at opposite sides of the trailer are substantially identical, corresponding parts on both sides of the trailer will bear the same reference numerals with the parts on the left-hand side including the prime notation.

Carriage means is provided at each side of the trailer and is supported for sliding movement along the tracks 26, 26' and comprises vertical carriage plates 27, 27' extending downwardly from the C-channels 26, 26'. Slide blocks 28, 28', preferably formed of a low friction material, such as polydura, are fixed to the upper ends of each of the carriage plates and are positioned for sliding movement in the C-channels 26, 26'. Guide bars 29 (FIG. 6) are fixed in the upper flanges of the C-channels 26 and ride in grooves in the upper ends of the support blocks 28 to maintain the same in the channels 26.

Drive means is provided for moving the carriage plates 27, 27' forwardly and rearwardly along the body of the trailer. The drive means includes an electric motor 30 (FIGS. 2 and 4) which is suitably fixed to the bottom 14 of the trailer. The motor 30 drives a belt 31 which in turn drives a drive pulley 32, fixed on the input shaft of a gear reduction unit 33. The output shaft 34 of the gear reduction unit 33 is provided with a sprocket 36 and a torque limitor 37 and a drive chain 38 engages a sprocket 40 on a transverse drive shaft 41. Opposite end portions of the transverse drive shaft 41 are supported for rotation in bearings fixed on the channels 26, 26' and the medial portion of the shaft 41 is rotatably supported by a bearing on the support for the gear reduction unit 33 (FIG. 2). Drive sprockets 42, 42' are fixed adjacent opposite ends of the shaft 41 and endless sprocket chains 43, 43' are supported at their forward ends on the sprocket 42, 42' while their forward ends are supported on idler sprockets 44, 44' (FIG. 6). The idler sprockets 44, 44' are rotatably supported on adjustment brackets 45, 45' which are fixed on the rearward ends of the channels 25, 26'. The lower reaches of the sprocket chains 43, 43' are drivingly connected to the carriage plates 27, 27' in a manner to be presently described.

Pusher means extends transversely of the railer and is supported at opposite ends on the carriage plates 27, 27'. The pusher means is adapted to push no more than a predetermined quantity of the sawdust W toward the discharge end of the trailer each time the carriage means moves rearwardly, as illustrated in FIG. 4. The pusher means includes a pivot rod 50 which is fixed at opposite ends to the inner surfaces of the vertical carriage plates 27, 27' and a pusher plate or board 51 hingedly connected at its upper edge to the pivot rod 50. The pusher board 51 is inclined rearwardly with its lower edge being slideably supported on the bottom 14 of the trailer. If desired, relatively narrow pusher plates may be provided on either the slide blocks 28, 28' or on the carriage plates 27, 27' to push any accumulated sawdust to the discharge end of the trailer as the carriage moves back and forth in the trailer.

Means is provided for varying the predetermined quantity of sawdust moved rearwardly and to the discharge end by the pusher plate 51 each time it moves rearwardly. In the present instance, the amount of sawdust moved to the discharge end with each rearward movement of the pusher plate 51 may be varied by lowering or raising the upper edge of the pusher plate 51 while varying the angular relationship between the pusher plate 51 and bottom 14. As illustrated in FIG. 6, additional holes 49 are provided above and below the pivot rod 50 and may be used to raise and lower the level of the pivot rod 50 to thereby adjust the height and angle of the pusher plate 51. However, it is to be understood that other means may be provided for varying the predetermined quantity of sawdust delivered out the discharge end of the trailer, in accordance with the firing requirements of the furnace.

Digger means extends transversely of the trailer and includes a rotary shaft 54 supported for rotation at opposite ends in suitable bearings in the lower portions of the vertical carriage plates 27, 27' and the shaft 54 is supported forwardly of the pusher board 51. The rotary shaft 54 includes radial spikes 55 extending outwardly therefrom and a drive sprocket 56 is fixed adjacent each end of the rotary shaft 54. The means for rotating the rotary shaft 54 includes the drive sprockets 56 and a pair of idler sprockets 57, 58 supported for rotation on each of the vertical carriage plates 27 and above the drive sprockets 56. The lower reaches of each of the sprocket chains 43, 43' extend over the idler sprockets 57, 58 and beneath the drive sprockets 56 to, at times, impart rotation to the rotary shaft 54, in a manner to be presently described.

Brake means engages the rotary shaft 54 for preventing rotation thereof by the sprocket chains 43, 43' upon forward movement of the pusher plate 51 until the rotary shaft 54 engages the bulk of the sawdust in the trailer. The brake means comprises brake shoes 60 carried by each of the vertical carriage plates 27, 27' and engaging opposed end portions of the rotary shaft 54. The brake shoes 60 normally prevent rotation of the drive sprocket 56 so that the carriage plates 27, 27' are normally moved forwardly and rearwardly by the lower reach of the sprocket chains 43, 43' without imparting rotation to the rotary shaft 54.

When the carriage plates 27, 27' and pusher plate 51 are moved forwardly against the bulk of the sawdust in the trailer, sufficient resistance is built-up to prevent further movement of the carriage. When this resistance becomes sufficient to overcome the effect of the brake shoes 60, the rotaryshaft will rotate. As the sprocket chains 43, 43' continue to move, the carriage plates 27, 27' do not move forwardly because of the resistance of the sawdust, rotation is imparted to the rotary shaft 54 so that the radial spikes 55 dig into and loosen the sawdust. Loosening the sawdust reduces the resistance to movement of the carriage plates 27, 27' so that they can move further forwardly and the rotary shaft 54 digs into the sawdust, permitting a portion of the sawdust to fall down onto the rearward side of the pusher plate 51. It is preferred that a time delay control be provided so that the rotary shaft 54 will rotate a predetermined time after it initially engages the bulk of the sawdust in the trailer and so that a sufficient quantity of the sawdust will be positioned in front of the pusher plate 51 before the direction of driving movement of the motor 30 is reversed to move the pusher plate 51 rearwardly to the discharge end of the trailer.

To protect the drive for the sprocket chains 43, 43', it is preferred that the forward end of the trailer be provided with an enclosure housing 61 (FIGS. 4 and 5) to exclude the sawdust from this area of the trailer. In order to protect the conveyor chains 43, 43' and the support plates 27, 27', it is preferred that inclined side boards 62, 62' be connected to opposite sides of the trailer and extend downwardly to a position above the rotary shaft 54. Also, flexible baffles, in the form of rubber flaps 63, 63', are provided along opposite sides of the trailer for aiding in preventing the entry of the sawdust into the areas along opposite sides of the trailer where the sprocket chains 43, 43' move.

Means, other than the rubber flaps 63, 63', may be provided along opposite sides of the trailer for aiding and preventing the entry of the sawdust into the areas along opposite sides of the trailer where the sprocket chains 43, 43' move. For example, baffle plates may be carried by the rotary shaft 54 for preventing the entry of the sawdust into the areas along opposite sides of the trailer where the sprocket chains 43, 43' move.

It is also preferred that the lower reaches of the sprocket chains 43, 43' run in flexible tubes 65 extending along opposite sides and supported on the channels, 26, 26'. The lower portions of the tubes 65 are split and pass on opposite sides of the tube opening rollers 66 (FIG. 6) supported on the vertical carriage plates 27, 27'. The rollers 66 open the chain guard tubes 65 so that the lower reaches of the chains can be directed downwardly over the idler sprockets 57, 58.

METHOD OF OPERATION

It is contemplated that an industrial plant will have several of the unloader trailers so that when the sawdust is unloaded from one trailer another trailer will be ready to be immediately unloaded. Also, one or more trailers may be transporting the sawdust from the source to the plant while other trailers are being unloaded and sufficient quantities of the sawdust may be stored in the trailers to provide fuel for the furnace for an extended period of time. The conveyor 20 (FIG. 1) may be increased in length so that more than one trailer may be positioned to unload the same or different types of particulate material onto the conveyor 20. In this case, controls can be provided to sequentially or selectively unload individual quantities from the trailers in the desired order.

With a full trailer positioned adjacent the conveyor belt 20, as illustrated in FIG. 1, a portion of the sawdust will immediately fall onto the conveyor belt 20 when the discharge end of the trailer is opened. The conveyor 20 may be provided with detector means to control the operation of the unloader mechanism in the trailer so that it will operate when additional fuel is required for the furnace 24. The trailer is filled with the sawdust while the unloader mechanism is positioned near the discharge end of the trailer, as illustrated in FIG. 6.

As soon as additional fuel is required for the furnace 24, the motor 30 will operate to move the conveyor chains 43, 43' so that the carriage plates 27, 27' are moved forwardly until the rotary shaft 54 meets sufficient resistance to overcome the holding power of the brakes 60. Then, rotation will be imparted to the rotary shaft 54 so that it digs into the sawdust and a quantity of the sawdust is deposited on the rearward side of the pusher plate 51, as illustrated in FIG. 4. The motor 30 will then reverse direction so that the rotary shaft 54 and the pusher plate 51 are moved rearwardly to the discharge end of the trailer so that no more than a predetermined quantity of the sawdust will be moved rearwardly and be discharged onto the conveyor 20.

While the unloader is operating near the rear or discharge end of the trailer, the sawdust in front of the pusher plate 51 will be deposited directly onto the conveyor 20 as the carriage plates 27, 27' move the pusher plate 51 to the discharge end of the trailer. In order to reduce the time required to deliver a quantity of sawdust to the conveyor 20 after a signal is received by the unloader indicating that additional fuel is required for the furnace, it is preferred that the unloader bring a quantity of the sawdust to a position closely adjacent to the discharge end and hold it there until needed. To this end, limit switches, not shown, are preferably provided at a position about six feet from the discharge end of the trailer so that the rearward movement of the pusher plate 51 will stop at this location.

After a quantity of sawdust has been delivered by the pusher plate 51, the carriage plates 27, 27' immediately move the pusher plate 51 forwardly in the trailer and against the bulk of the sawdust and then move the predetermined quantity of sawdust rearwardly to a position where the limit switches are engaged to stop the rearward movement of the load of sawdust. This particular quantity of sawdust will remain in this position until additional fuel is required by the furnace and then the pusher plate 51 will move the sawdust rearwardly and discharge it out of the end of the trailer and onto the conveyor 20. The pusher plate 51 will then be immediately moved forwardly to pick up another quantity of sawdust and move it toward the rearward end where it will be maintained at a position about six feet from the discharge end so that it can be quickly moved onto the conveyor 20, upon receiving a signal that the furnace needs additional fuel.

The motor 30 will then be reversed and the pusher plate 51 and rotary shaft 54 will then be moved forwardly in the trailer until they again meet the resistance of the waste product W. As the pivoted pusher plate 51 is moved forwardly, the lower edge will be lifted by and pass over any of the sawdust on the bottom 14. The rotary shaft 54 will then be rotated to dig into the sawdust and deposit a quantity of the sawdust in front of the pusher plate 51. The carriage will then move rearwardly and the lower edge of the pivoted pusher plate 51 will slide along the bottom to push no more than a predetermined amount of the sawdust out of the discharge end of the trailer. If a surplus amount of the sawdust is deposited in front of the pusher plate 51, as shown in FIG. 4, the surplus sawdust will merely pass over the top of the pusher plate 51 as it moves to the rear of the trailer. Thus, no more than a predetermined amount of the sawdust is moved to the discharge end of the trailer with each rearward movement of the pusher plate 51. This operation of the unloader will continue until the sawdust has been removed from the trailer. Even when the sawdust is in a wet condition, the unloader of the present invention still operates to unload the sawdust from the trailer and feed it into the furnace in a uniform manner, as needed.

The amount of sawdust moved rearwardly with each movement of the pusher plate 51 depends upon the angle at which the pusher plate 51 is disposed and/or the height of the upper edge of the pusher plate 51. When particulate material in the form of sawdust is being unloaded, any surplus amount of sawdust positioned rearwardly of the pusher plate will usually pass over or spill over the pusher plate as it moves rearwardly so that a predetermined quantity will be carried to the discharge end, in the case of a nearly full trailer, and carried to a position approximately 6 feet from the discharge end, in the case of a trailer in which a substantial amount of sawdust has been removed therefrom. However, the amount of particulate material moved toward the discharge end of the trailer during each rearward movement of the pusher plate 51 will also depend upon the type of particular material being moved. For example, any surplus amount of sawdust will more readily pass over or spill over the pusher plate as it is moved to the discharge end than other types of particulate material, such as tree bark and the like.

In the drawings and specification, there has been set forth a preferred embodiment of the invention, and although specific terms are employed, they are used in a generic and descriptive sense only and not for purposes of limitation, the scope of the invention being defined in the claims.

That which is claimed is:

1. A portable self unloading container for particulate material adapted to be moved between a loading position where said container is filled with the particulate material and an unloading position where the particulate material is to be discharged, said self unloading container comprising
    a. a storage chamber for confining the particulate material therein and including a bottom wall and a discharge opening operatively associated with said bottom wall to permit particulate material moved along said bottom wall to pass therethrough,
    b. carriage means mounted within said storage chamber for reciprocating movement over said bottom wall toward and away from said discharge opening,
    c. particulate material moving means carried by said carriage means for movement therewith and cooperating with said bottom wall for pushing a predetermined quantity of particulate material along said bottom wall and out of said discharge opening with each movement of said particulate material moving means toward said discharge opening, said particulate material moving means comprising an elongate pusher member having its longitudinal dimension disposed parallel to said bottom wall and its bottom edge normally in sliding contact with said bottom wall, said pusher member including an upper edge spaced a substantial distance below the top of said container, and said pusher member being transversely inclined in a direction away from said discharge opening so that any excess material between said pusher member and said discharge opening will spill over said upper edge of said pusher member as it moves toward said discharge opening and the predetermined quantity of particulate material will be moved out of said discharge opening, and
    d. digger means carried by said carriage means and on the opposite side of said pusher member from said discharge opening to engage and loosen the particulate material when said carriage is moved away from said discharge opening and against the particulate material so that particulate material will be positioned between said pusher member and said discharge opening.

2. A self unloading container for storing a particulate material and for discharging the particulate material therefrom at a predetermined rate comprising
    a. a body portion including a storage chamber for confining the particulate material therein and including a bottom wall and a discharge opening aligned with said bottom wall to permit particulate material moved along said bottom wall to pass therethrough,
    b. carriage means mounted within said storage chamber for reciprocating movement over said bottom wall toward and away from said discharge opening,
    c. particulate material moving means carried by said carriage means for movement therewith and cooperating with said bottom wall for moving particulate material along said bottom wall and out of discharge opening, said particulate material moving means comprising an elongate pusher member having its longitudinal dimension disposed parallel to said bottom wall and its bottom edge normally in sliding contact with said bottom wall, said pusher member including an upper edge spaced a substantial distance below the top of said storage chamber, said pusher member being transversely inclined in a direction away from said discharge opening at such an angle that no more than a predetermined quantity of the particulate material will be moved toward said discharge opening with any excess material moving up the inclined pusher member and spilling over said upper edge thereof,
    d. means for varying the positional relationship of said pusher member to vary the quantity of particulate material being moved thereby, and
    e. rotary digger means supported on said carriage means and forwardly of said pusher member to engage and loosen the particulate material when said carriage is moved away from said discharge opening and against the particulate material so that particulate material will fall down and be positioned between said pusher member and said discharge opening.

3. An unloader for a storage container including an elongate body with a closed forward end, opposite sides, a bottom, and a rear discharge end having an opening at least adjacent said bottom, said storage container being adapted to store particulate material for removal by said unloader, said unloader comprising
    a. carriage means positioned at each side of said container and supported for forward and rearward movement along said bottom of said storage container,
    b. pusher means extending transversely of said container and being supported at opposite ends on said carriage means, said pusher means being adapted to push a quantity of the particulate material toward said discharge end when said carriage means moves rearwardly, and
    c. digger means carried by said carriage means and forwardly of said pusher means, and
    d. means for imparting rotation to said digger means to loosen the particulate material when said digger means is moved forwardly and against the particulate material so that the loosened material will be positioned rearwardly of said pusher means.

4. An unloader according to claim 3 wherein said digger means comprises a rotary shaft and radial spikes carried thereby and extending outwardly therefrom.

5. An unloader according to claim 3 wherein said pusher means (b) comprises a pusher board inclined rearwardly with its lower edge slideably supported on said bottom of said container, and means hingedly supporting said pusher board on said carriage means.

6. In a wheeled vehicle including an elongate body with a closed forward end, opposite sides, a bottom, and a rear discharge end having an opening at least adjacent said bottom, said vehicle being adapted to transport and store a particulate material, such as sawdust, the combination therewith of unloader means movable along said bottom of said vehicle for removing the particulate material from said vehicle, said unloader means comprising a. track means extending along said opposite sides and adjacent said bottom of said vehicle,
b. carriage means positioned at each side of said vehicle and supported for movement along said track means,
c. drive means for moving said carriage means forwardly and rearwardly along said elongate body of said vehicle,
d. pusher means extending transversely of said vehicle and being supported at opposite ends on said carriage means, said pusher means being adapted to push a quantity of the particulate material toward said discharge end when said carriage means moves rearwardly, and
e. a rotary shaft extending transversely of said vehicle and being supported at opposite ends on said carriage means and forwardly of said pusher means, said rotary shaft including radial spikes extending outwardly therefrom to engage and loosen the particulate material and to permit entry of said rotary shaft into the particulate material so that a portion of the particulate material is positioned on the rearward side of said pusher means to be moved out of the delivery end of said vehicle upon rearward movement of said carriage means.

7. In a wheeled vehicle according to claim 6 including
f. brake means engaging said rotary shaft for preventing rotation of said rotary shaft until said rotary shaft engages the particulate material when moved forwardly by said carriage means.

8. In a wheeled vehicle according to claim 7 wherein said track means (a) comprises a pair of C-channels with their open sides facing the interior of said vehicle.

9. In a wheeled vehicle according to claim 8 wherein said carriage means (b) comprises a vertical carriage plate extending downwardly from each of said C-channels, and including a slide block fixed to the upper ends of each of said carriage plates and being positioned for sliding movement in said C-channels.

10. In a wheeled vehicle according to claim 9 wherein said drive means (c) comprises an endless sprocket chain extending along said opposite sides, said sprocket chains each including a lower reach supported for movement adjacent the inner surface of corresponding ones of said C-channels and being normally adapted to move said carriage plates and said slide blocks forwardly and rearwardly along said C-channels.

11. In a wheeled vehicle according to claim 10 wherein said pusher means (d) comprises a pusher board inclined rearwardly with its lower end slideably supported on said bottom of said vehicle, and means hingedly connecting the upper end of said pusher board to said carriage means.

12. In a wheeled vehicle according to claim 11 wherein said rotary shaft (e) includes a sprocket fixed on each end thereof and adjacent said carriage plates, and including a pair of idler sprockets rotatably supported on each of said carriage plates and above each of said drive sprockets on said rotary shaft, the lower reaches of each of said drive chains passing over said idler sprockets and beneath said drive sprockets.

13. In a wheeled vehicle according to claim 12 wherein said brake means (f) comprises a pair of brake shoes engaging opposite end portions of said rotary shaft and being supported on corresponding ones of said carriage plates for normally preventing rotation of said drive sprockets and said rotary shaft but permitting rotation of said rotary shaft when said carriage means moves forwardly and engages the particulate material so that sufficient resistance to movement of said carriage means takes place to overcome said brake means.

* * * * *

UNITED STATES PATENT AND TRADEMARK OFFICE
CERTIFICATE OF CORRECTION

PATENT NO. : 4,078,677
DATED : March 14, 1978
INVENTOR(S) : Major B. Huggins, Jr. and Ralph H. Rollins It is certified that error appears in the above-identified patent and that said Letters Patent are hereby corrected as shown below:

In the references cited, the date "10/1969" of Roberts Patent No. 3,212,652 should be -- 10/1965 --.

Column 1, line 21, "availble" should be -- available --.

Column 1, line 33, following "may" insert -- be --.

Column 3, line 53, "sprocket" should be -- sprockets --.

Column 3, line 57, "25" should be -- 26 --.

Column 3, line 61, "railer" should be -- trailer --.

Column 4, line 60, "rotaryshaft" should be -- rotary shaft --.

Column 8, line 24, insert -- said -- at the beginning of the line.

Signed and Sealed this

Nineteenth Day of February 1980

[SEAL]

Attest:

SIDNEY A. DIAMOND

Attesting Officer *Commissioner of Patents and Trademarks*